(12) United States Patent
Zhang et al.

(10) Patent No.: US 8,191,716 B2
(45) Date of Patent: Jun. 5, 2012

(54) HORIZONTAL-TUBE SEDIMENTATION-SEPARATION APPARATUS

(75) Inventors: Liangchun Zhang, Zhuhai (CN);
Jianguo Zhang, Zhuhai (CN)

(73) Assignee: Zhuhai 9Tone Water Service Co., Ltd., Zhuhai (CN)

( * ) Notice: Subject to any disclaimer, the term of this patent is extended or adjusted under 35 U.S.C. 154(b) by 33 days.

(21) Appl. No.: 12/472,026

(22) Filed: May 26, 2009

(65) Prior Publication Data

US 2010/0018916 A1 Jan. 28, 2010

Related U.S. Application Data

(63) Continuation-in-part of application No. PCT/CN2007/003313, filed on Nov. 23, 2007.

(30) Foreign Application Priority Data

Nov. 24, 2006 (CN) .......................... 2006 1 0123752

(51) Int. Cl.
 *B01D 21/02* (2006.01)
(52) U.S. Cl. ..................................... 210/521; 210/532.1
(58) Field of Classification Search .................. 210/521, 210/522, 532.1, 802
See application file for complete search history.

(56) References Cited

U.S. PATENT DOCUMENTS

| | | | | |
|---|---|---|---|---|
| 3,494,475 A | * | 2/1970 | Hjort et al. | 210/521 |
| 3,529,728 A | * | 9/1970 | De Jonge et al. | 210/522 |
| 3,687,298 A | * | 8/1972 | Rozkydalek | 210/522 |
| 4,089,782 A | * | 5/1978 | Huebner | 210/522 |
| 4,110,211 A | * | 8/1978 | Henrikson | 210/802 |
| 4,120,796 A | * | 10/1978 | Huebner | 210/522 |
| 4,328,101 A | | 5/1982 | Broden | |
| 4,857,208 A | * | 8/1989 | Jennelle | 210/802 |
| 5,089,136 A | * | 2/1992 | Cyr | 210/521 |
| 5,173,195 A | * | 12/1992 | Wright et al. | 210/521 |
| 6,605,224 B2 | * | 8/2003 | Aymong | 210/521 |

FOREIGN PATENT DOCUMENTS

| | | |
|---|---|---|
| CN | 2853140 | 1/2007 |
| JP | 56045712 | 4/1981 |

OTHER PUBLICATIONS

International Search Report PCT/CN2007/003313 and English translation thereof.

* cited by examiner

*Primary Examiner* — Christopher Upton
(74) *Attorney, Agent, or Firm* — Nils H. Ljungman & Associates (57) ABSTRACT

A horizontal-tube segmentation-separation apparatus has multiple parallel inclined plates, which are arranged in pairs having an upper inclined plate and a lower inclined plate. Between the inclined plate pairs are isolated plates which are parallel thereto. One or more baffles are set under the isolated plates transverse to the flow of water to block the flow of water under the isolated plates. Between the isolated plate and the upper inclined plate is a flat supporting plate which separates the water flowing region into several water channels that have a parallelogram-shaped cross-section.

20 Claims, 10 Drawing Sheets

HORIZONTAL-TUBE SEDIMENTATION-SEPARATION APPARATUS

CONTINUING APPLICATION DATA

This application is a Continuation-In-Part application of International Patent Application No. PCT/CN2007/003313, filed on Nov. 23, 2007, which claims priority from People's Republic of China Patent Application No. 200610123752.2, filed on Nov. 24, 2006. International Patent Application No. PCT/CN2007/003313 was pending as of the filing date of this application. The United States was an elected state in International Patent Application No. PCT/CN2007/003313.

FIELD OF THE INVENTION

The present invention relates to a wastewater treatment equipment. In particular, it relates to a horizontal-tube sedimentation-separation apparatus.

BACKGROUND OF THE INVENTION

Based on the shallow-basin theory that was brought up by American scientist Hazen in 1904, inclined plate sedimentation tank, inclined tube sedimentation tank and labyrinth sedimentation tank were successively developed, and their structure were designed as much close as an ideal sedimentation tank. However, these sedimentation tanks mentioned above (including same-directional, counter-directional, and transverse directional sedimentation tank) are characterized by following disadvantages:

Firstly, flowing water needs to change its direction when through the inclined tube or inclined plate (same-directional, counter-directional), thus leads to water state variation and is harmful to the suspension sedimentation.

Secondly, the process of water flowing through inclined tube or inclined plate has a washing and disturbing effect on sedimentary suspension, which would probably be re-agitated by water flowing and causes reversible sedimentation.

Thirdly, two triangle dead zones would be formed when the inclined tube (inclined plate) are installed as components, which causes decreased usage rate of the sedimentation tank and reduced area of flowing water.

The above defects of current sedimentation equipments significantly constrict their sedimentary capacity and impair the clarification effect.

SUMMARY OF THE INVENTION

To deal with the technological problems mentioned above, a type of horizontal-tube sedimentation-separation apparatus is provided in this invention to overcome the defects of current sedimentation equipments.

The present application relates to a water disposal device, in particular to a horizontal pipe deposition separating device. When existing deposition devices are used for purifying water, the water flow generate adverse effect to the deposition; furthermore, the deposition can not betimes separated from the pure water. Therefore, the horizontal pipe deposition separating device comprises multi-group parallel oblique plates; each group of parallel oblique plates comprises an upper oblique plate and a lower oblique plate; a plurality of baffle plates are arranged between the upper oblique plate and the lower oblique plate; the upper part of the crossing between the lower oblique plate and each baffle plate is provided with a mud discharging port; a mud discharging slideway is arranged between each lower oblique plate and the other adjacent group of parallel oblique plates or oblique pool wall; each mud discharging slideway is provided with at least one enclosed end in order to form a static liquid area. By the design, when sewage passes through the horizontal pipe deposition separating device, suspension matters slide down along the baffle plates or the lower oblique plates under the actions of self-weight and precipitator such as alum, etc., enter the mud discharging slideway through the mud discharging port, and are then discharged into a mud hopper through the mud discharging slideway. The present application is an ideal updated product for the existing deposition separating device as well as a necessary weapon for updating and potential tapping the existing deposition pools.

In order to solve the above technological problems, this invention brings up a horizontal-tube sedimentation-separation apparatus comprising multiple parallel inclined plates characterized in that between adjacent inclined plates are isolated plates which are parallel to inclined plates. One or more baffles are set under the isolated plates; the baffles are vertical to the water flowing direction and block water flowing under the isolated plate, thereby forming a static fluid region. The static fluid region together with the water flowing region (hereinafter referred to flowing region) up the isolated plates compose as one working unit. There are N lines of sludge-disposal paths on the isolated plate, and each path is designed as a long-tank extended in the water flowing direction or multiple sludge-disposal ports distributed along the water flowing direction. N represents a positive integral.

Designed in accordance with the above, the static fluid region only connects with the flowing region where the narrow sludge-disposal path is, and the suspension settles due to self gravity when water flows through the flowing region and avoids being washed and disturbed when water gets into the static fluid region. Therefore the prompt and complete separation of sedimentation from clean water is accomplished and the sedimentary efficiency is guaranteed.

As a preferable design, between isolated plate and upper inclined plate is flat supporting plate, whose upper end connects with upper inclined plate and its lower end connects with and also flush with the bottom margin of the long-tank or that of sludge-disposal path. This design ensures that there will be no sediment on the top region of flat supporting plate. The short sedimentary distance and that water flowing in and out horizontally require no space for water inlet or outlet, which would reduce the depth of sedimentation tank. Due to the horizontal water flow, suspensions are continuously separated in water flowing process and have strong resistance to load impact force. In addition, this apparatus is not limited in respect of length, which means the length can be properly extended and the residence time would be prolonged to guarantee better sedimentation efficiency.

As a preferable design, the main body of this horizontal-tube sedimentation-separation apparatus has parallelogram cross-section inclined toward one side. When used in a rectangle sedimentation tank, this design forms dead zones in both the lower inner side and upper outer side of main body. To make sure that this horizontal-tube sedimentation-separation apparatus be in normal operation, a matched sedimentation tank with corresponding parallelogram cross-section is required or setting baffles in the dead zones to turn them into static fluid regions.

As a preferable design, an upper compensating body comprising multiple groups of inclined plates with their width gradually increased from top to bottom is set in the upper side of main body. Its cross-section mixes with the main body cross-section to form an inverted right-angled trapezoid. The static fluid regions between inclined plates connect with vertical sedimentary slide path located outside. This design eliminates the upper dead zone and the matched sedimentation tank could have inverted right-angled trapezoid cross-section, which is suitable for construction.

As a preferable design, a lower compensating body comprising multiple groups of inclined plates with their width gradually decreased from top to bottom is set in the lower and inner side of the main body. The cross-sections of the upper compensating body, main body and this lower compensating body mix and form a rectangle. This design eliminates the lower dead zone and the matched sedimentary tank could be normal and have rectangular cross-section.

As a preferable design, all the angles formed between inclined plates, isolated plates, flat supporting plates and the horizontal surface are 60°. This design is proved to be of the best sludge-sliding effect by practical experience.

As a preferable design, the flat supporting plates divide the water flowing region into several raw water channels, and the upper and lower inclined plates, isolated plates and flat supporting plates around each of the channel form tube material which have parallelogram cross-section. This design makes it possible that the horizontal-tube sedimentation-separation apparatus consist of multiple tubes aligned in clusters that have sludge-disposal paths and diamond-shaped cross-section.

This sedimentation tank consists of the sedimentation tank itself and its inner sedimentation apparatus, which is the horizontal-tube sedimentation-separation apparatus mentioned above.

With these technical schemes adopted, parallel water flowing and vertical suspension sedimentation will be obtained when water flows through this horizontal-tube sedimentation-separation apparatus. Under certain flow velocity (same-directional or counter-directional), the applied component force on suspension is the smallest, thus flowing water won't play a harmful effect on sedimentation. Meanwhile, the sludge-disposal paths timely separate the deposited suspension, which accomplish the separation of water from suspension and that water and sludge run in different paths. The deposited sludge can be timely and completely separated from water flow, thus makes the sedimentation process irreversible. This horizontal-tube sedimentation-separation apparatus is an ideal upgrade product for current sedimentation-separation equipment as well as a revolutionary improvement on current sedimentation tank.

BRIEF DESCRIPTION OF THE DRAWINGS

Combined with attached figures and different detailed description of the preferred embodiments, brief description of the horizontal-tube sedimentation-separation apparatus are made as below.

The directions of arrows indicate the sedimentary directions of suspension in from FIG. 5 to FIG. 8; and direction of arrow indicates water flow direction in FIG. 9.

Note: 1-inclined plate; 101-upper inclined plate; 102-lower inclined plate; 2-isolated plate; 3-baffle; 4-static fluid region; 5-flowing region; 6-long-tank; 7-sludge-disposal path; 8-flat supporting plate; 9-vertical sedimentation slide path; 10-raw water channel; 2-isolated plate; 11-tube material; 12-sludge-sliding path formed by baffles separating the static fluid region; 13-triangle baffle; 14-slope surface; 15-upper compensating body; 16-lower compensating body; 17-section material with ⊓ type cross-section.

DETAILED DESCRIPTION OF THE PREFERRED EMBODIMENTS

First Embodiment

Figure 1:
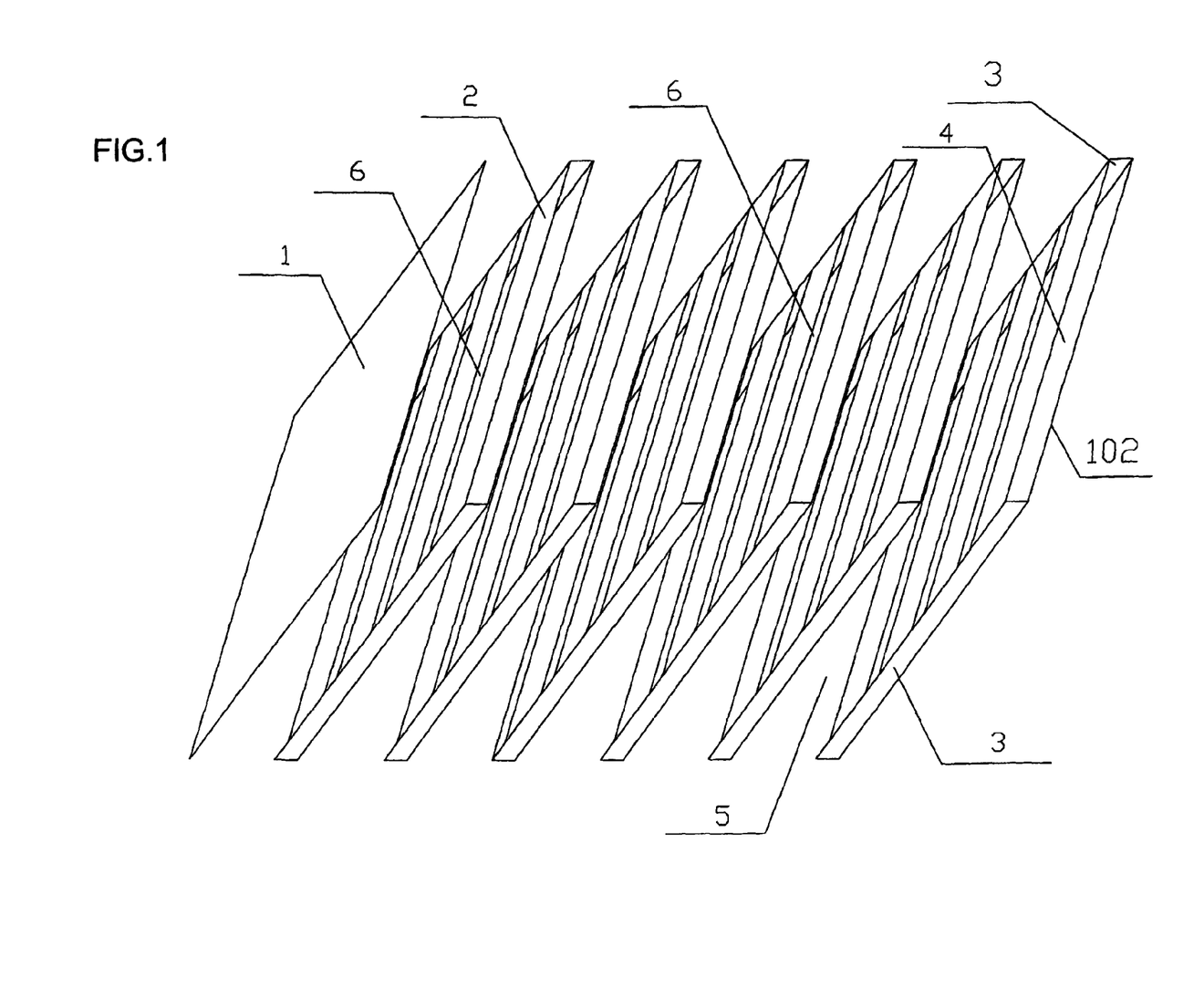
FIG. 1 describes the structure diagram of the horizontal-tube sedimentation-separation apparatus of a first embodiment of the present invention.

As described in FIG. 1, this horizontal-tube sedimentation-separation apparatus incorporates multiple parallel inclined plates 1, and between adjacent inclined plates 1 are isolated plates 2 which are parallel to inclined plate. Baffles 3 that are vertical to the water flowing direction are set in front of and back of the bottom of isolated plate 2, which blocks water flowing under the isolated plate 2, thereby forming a static fluid region 4. The static fluid region 4 together with the flowing region 5 up the isolated plate forms a working unit. Multiple sludge-disposal paths are set on isolated plate 2 from top to bottom, and each of them is designed as a long-tank 6 extended in the direction of water flow.

Second Embodiment

Figure 2:
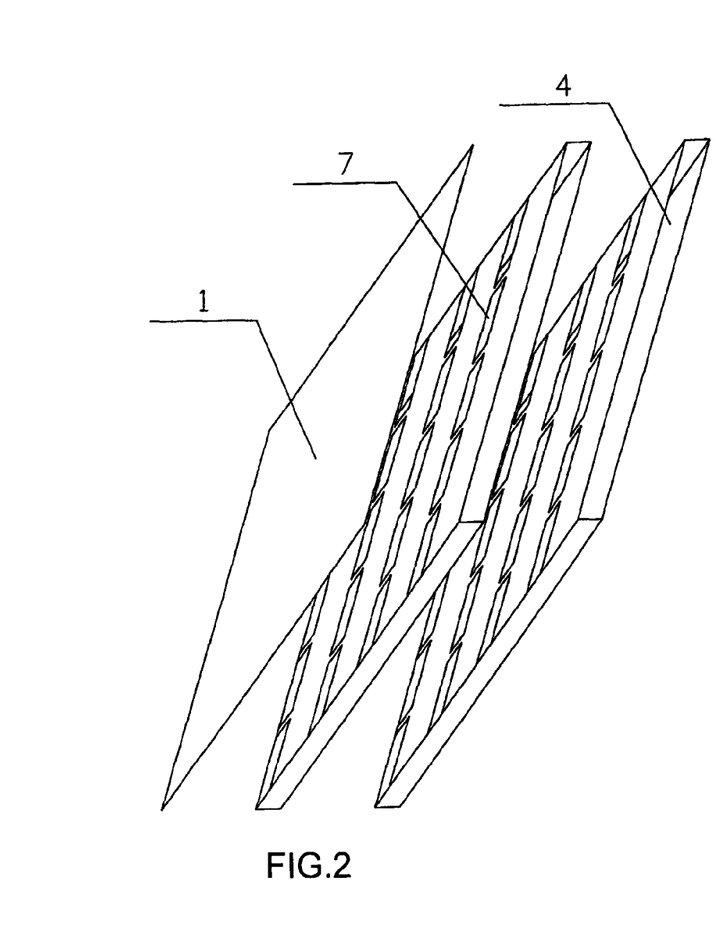
FIG. 2 describes sectional structure diagram of the horizontal-tube sedimentation-separation apparatus of a second embodiment of the present invention.

As described in FIG. 2, each line of sludge-disposal path consists of multiple sludge-disposal ports 7 distributed along the direction of water flow. Other components and structures are the same as described in first embodiment.

Third Embodiment

Figure 3:
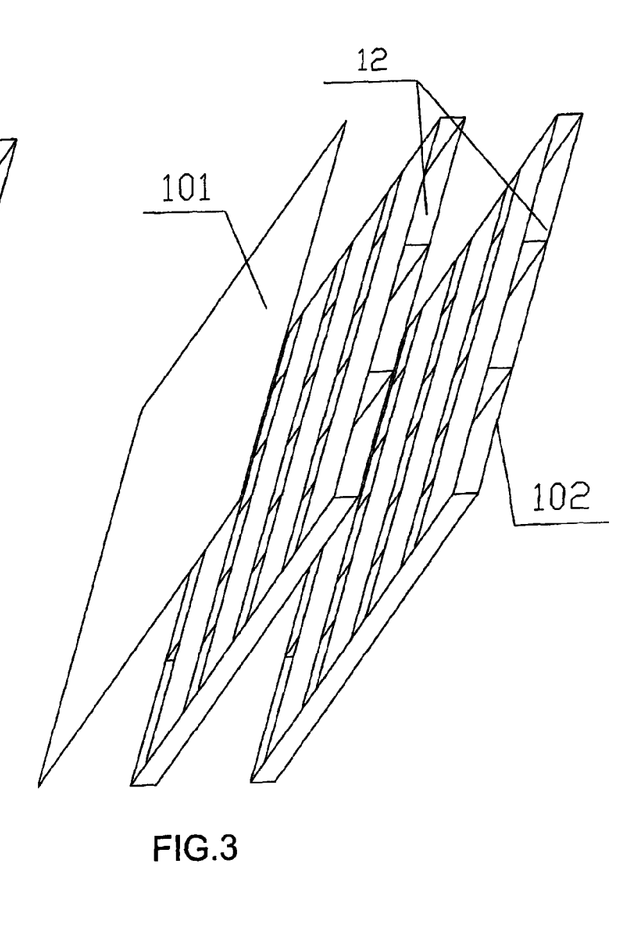
FIG. 3 describes sectional structure diagram of the horizontal-tube sedimentation-separation apparatus of a third embodiment of the present invention.

As described in FIG. 3, there are four pieces of baffle 3. Other components and structures are the same as described in first embodiment. The front and back baffles tightly connect with isolated plate and lower inclined plate, thus forming static fluid region. Intermediate baffle plays a supporting and reinforcing role to prevent deformation of and the closing between isolated plate and lower inclined plate.

Fourth Embodiment

Figure 4:
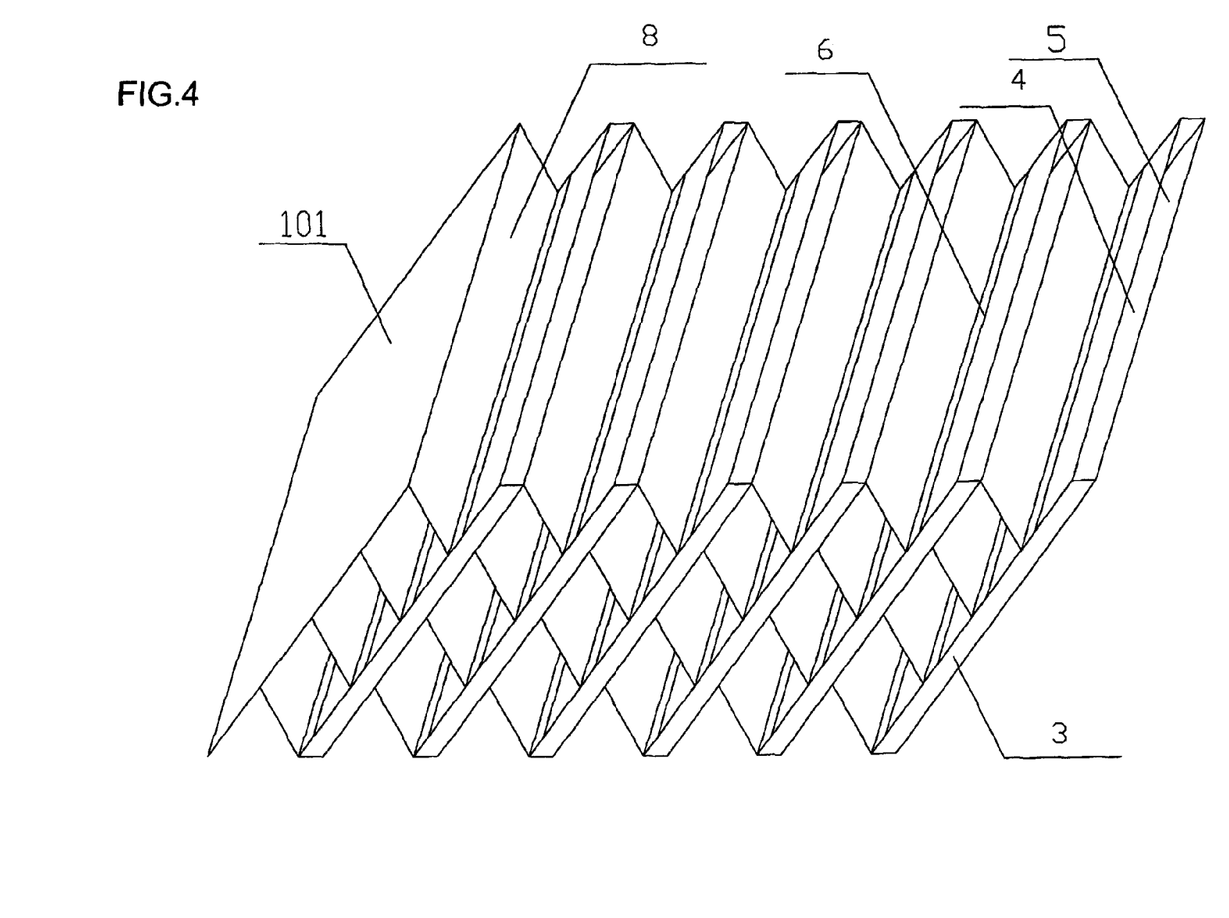
FIG. 4 describes the structure diagram of the horizontal-tube sedimentation-separation apparatus of a fourth embodiment of the present invention.
Figure 5:
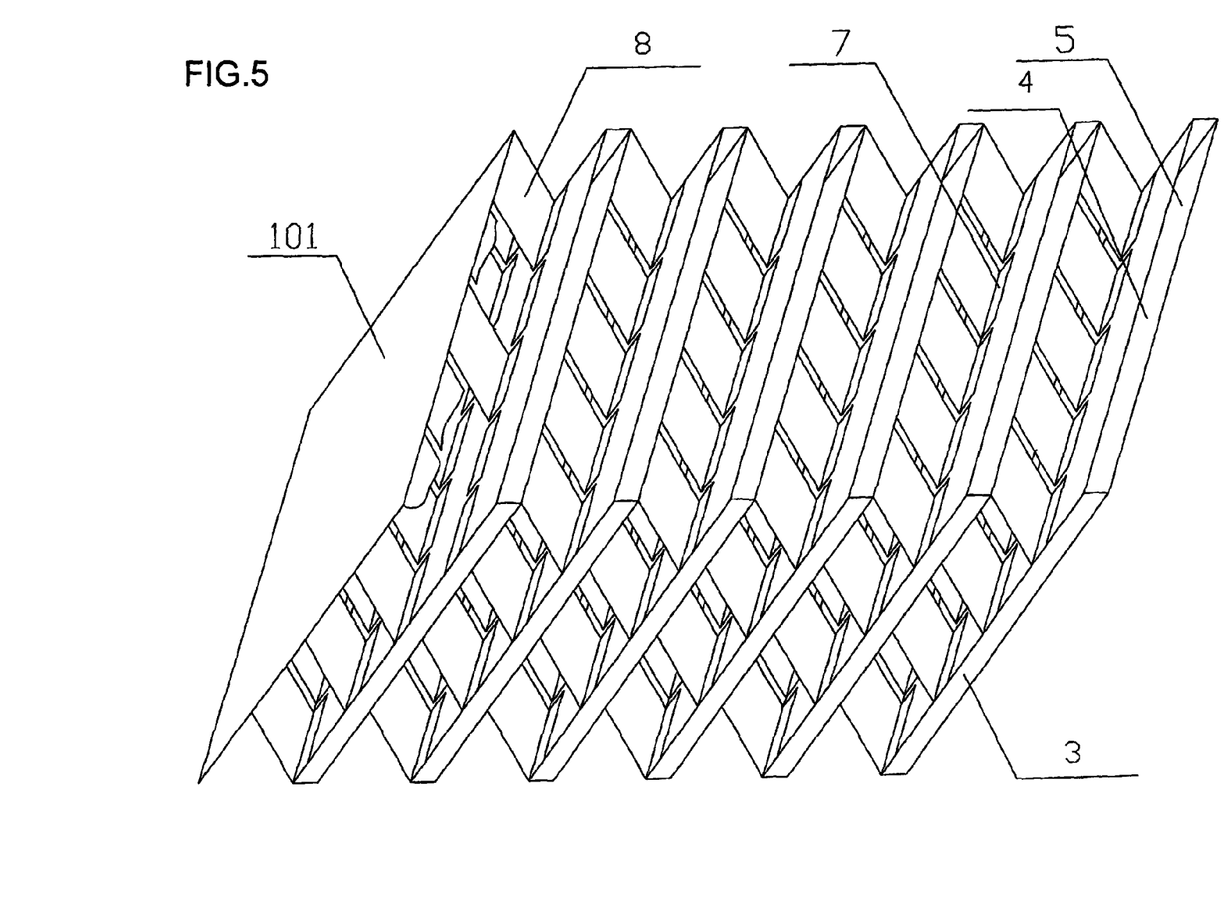
FIG. 5 describes the structure diagram of the horizontal-tube sedimentation-separation apparatus of a fifth embodiment of the present invention.

As described in FIG. 4 and FIG. 5, between isolated plate 2 and its upper inclined plate 101 is the flat supporting plate 8, whose upper end connects with upper inclined plate 101 and its lower end connects with and also flush with the bottom margin of long-tank 6. Other components and structures are the same as described in first embodiment.

The sludge-disposal path is designed as a long-tank 6 that extended in the direction of water flow. The flat supporting plate 8 is of a complete rectangle shape. The sludge-disposal path is designed as a long-tank 6 that extended in the direction of water flow, and each long-tank requires a complete and rectangle flat supporting plate 8 to match as described in FIG. 4.

Fifth Embodiment

As described in FIG. 5, the sludge-disposal path consists of multiple sludge-disposal ports 7 distributed in the direction of water flow. Each sludge-disposal port 7 requires a piece of flat supporting plate 8 to match, thus the sedimentation would not be deposited and accumulated between adjacent sludge-disposal paths 7. Other components and structures are the same as described in the first embodiment.

Figure 6:
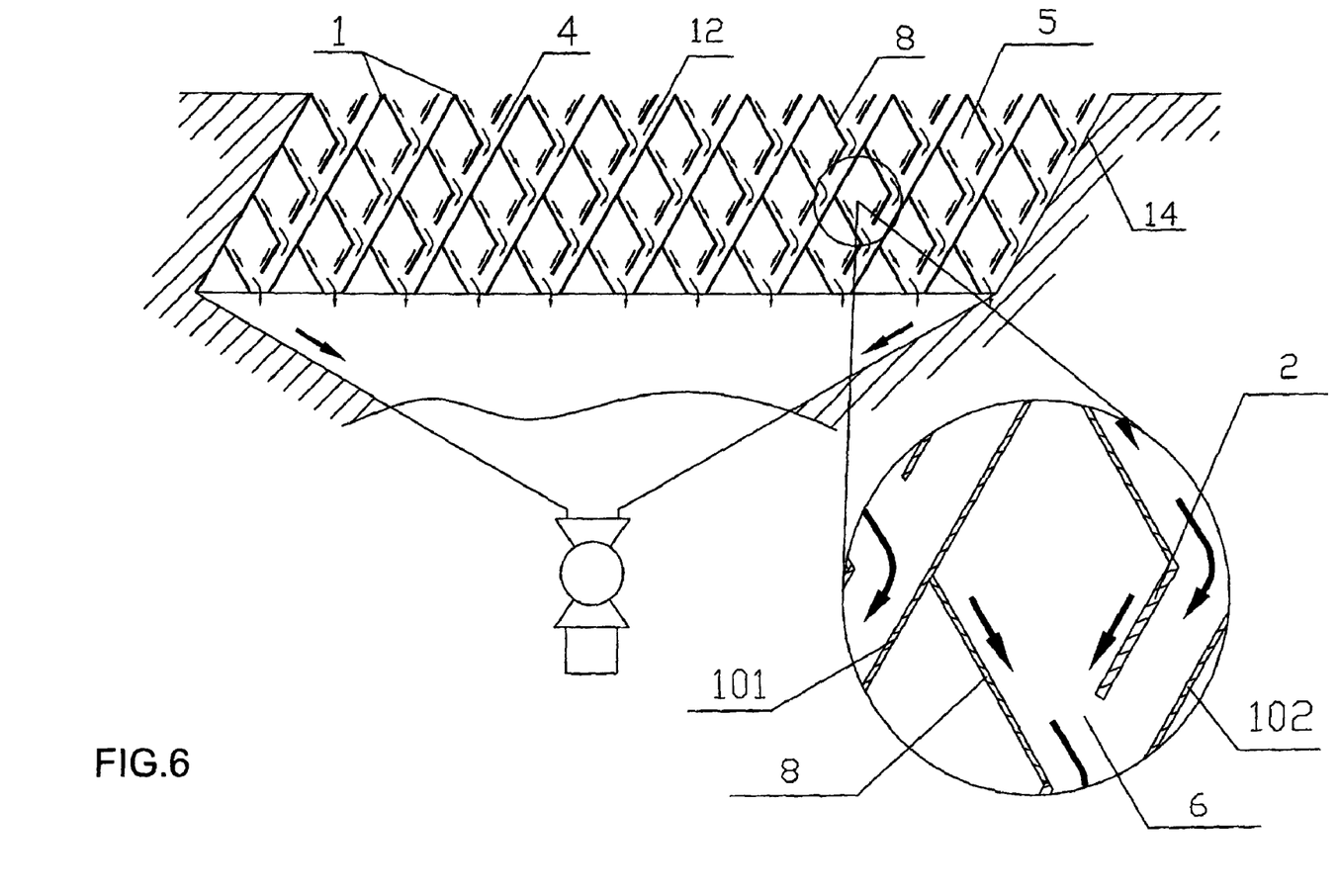
FIG. 6 describes the diagram of intermediate cross-section of the sedimentation tank (I) installed of the fourth embodiment of the present invention.
Figure 7:
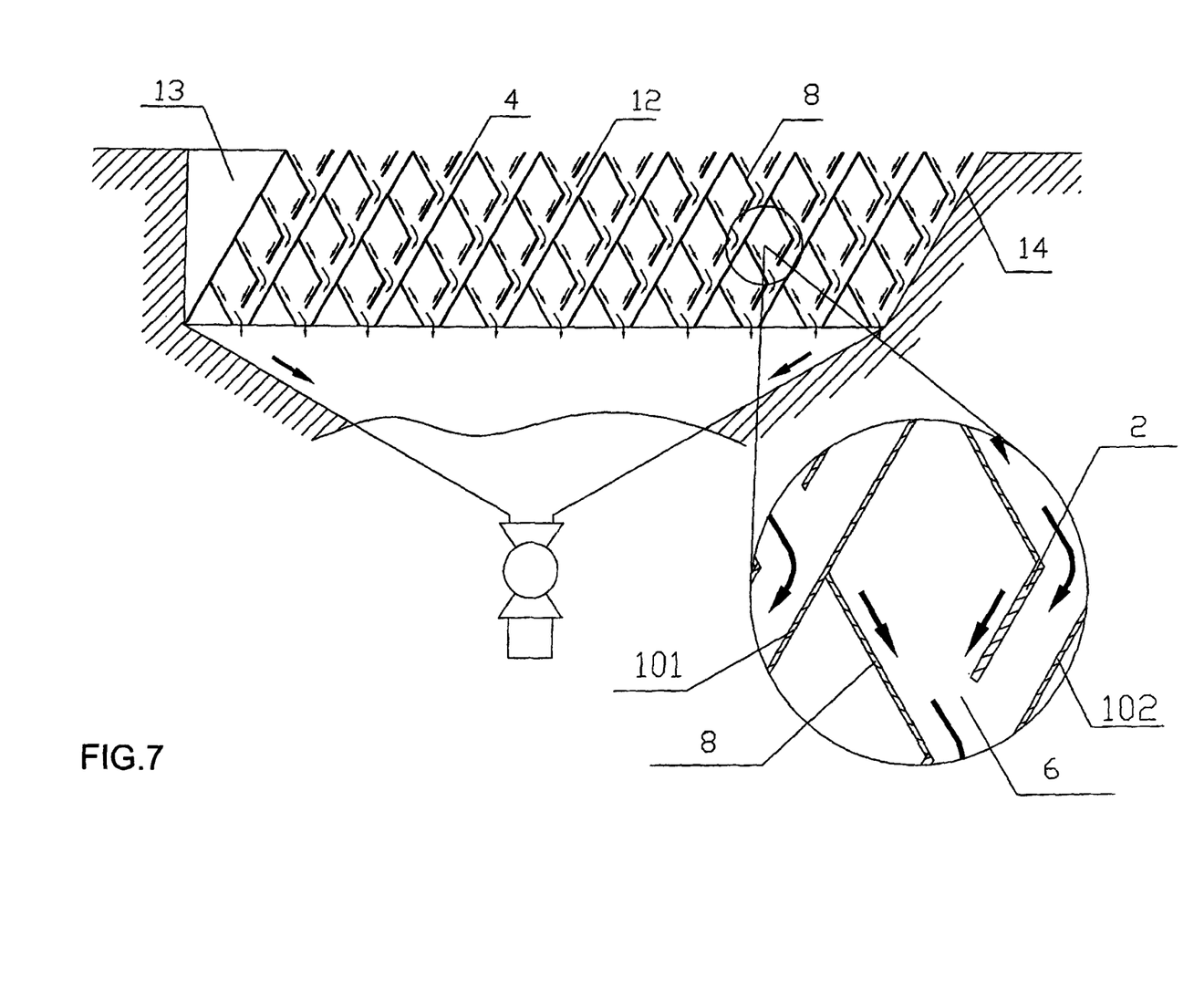
FIG. 7 describes the diagram of intermediate cross-section of the sedimentation tank (II) installed of the fourth embodiment of the present invention.

The main body of this horizontal-tube sedimentation-separation apparatus has parallelogram cross-section inclines toward one side. When it is in usage, dead zones would be formed both in the lower inner side and upper outer side of main body. To make sure that this horizontal-tube sedimentation-separation apparatus is in normal operation, the matched sedimentation tank should have corresponding parallelogram cross-section (as described in FIG. 6), or a piece of triangle baffle 13 should be set in each dead zone, which turns the dead zone into static fluid region. Replacing the tank wall that is against the inner main body with a corresponding slope surface 14 will eliminate the dead zone in the lower inner side of main body and save a piece of baffle (as described in FIG. 7). All the angles formed between inclined plate 1, isolated plate 2, flat supporting plate 8 and horizontal surface are 60°.

Sixth Embodiment

Figure 8:
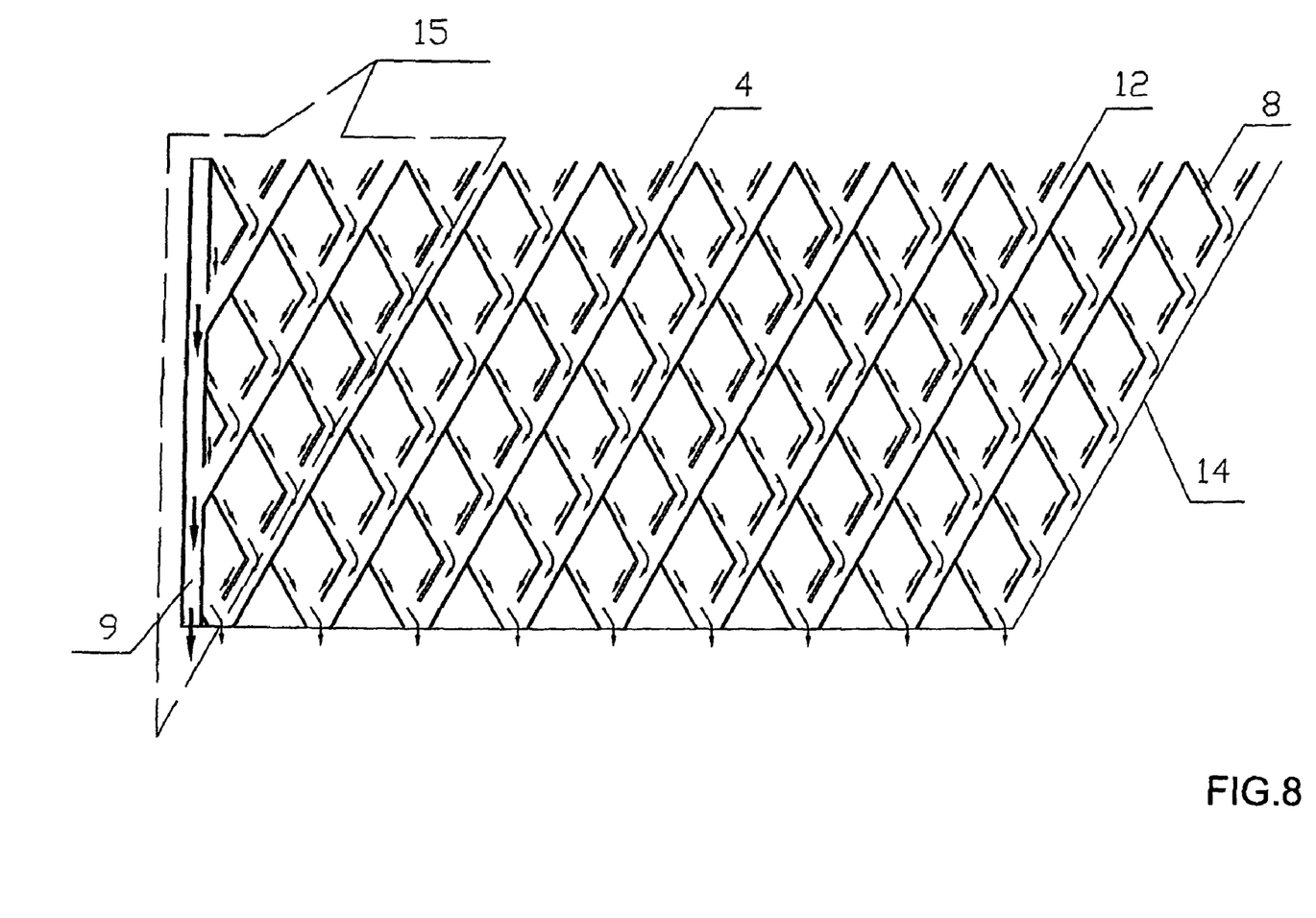
FIG. 8 describes the diagram of intermediate cross-section of the horizontal-tube sedimentation-separation apparatus of a sixth embodiment of the present invention.

As described in FIG. 8, up the outer side of main body is an upper compensating body 15, whose cross-section mixes with the main body cross-section and forms an inverse right-angled trapezoid. The upper compensating body 15 incorporates multiple groups of inclined plates 1 with their width gradually increased from top to bottom. The static fluid regions 4 between inclined plates 1 are all connected with the vertical sedimentation slide path 9 that located outside. Other components and structures are the same as described in the fourth embodiment.

Seventh Embodiment

Figure 9:
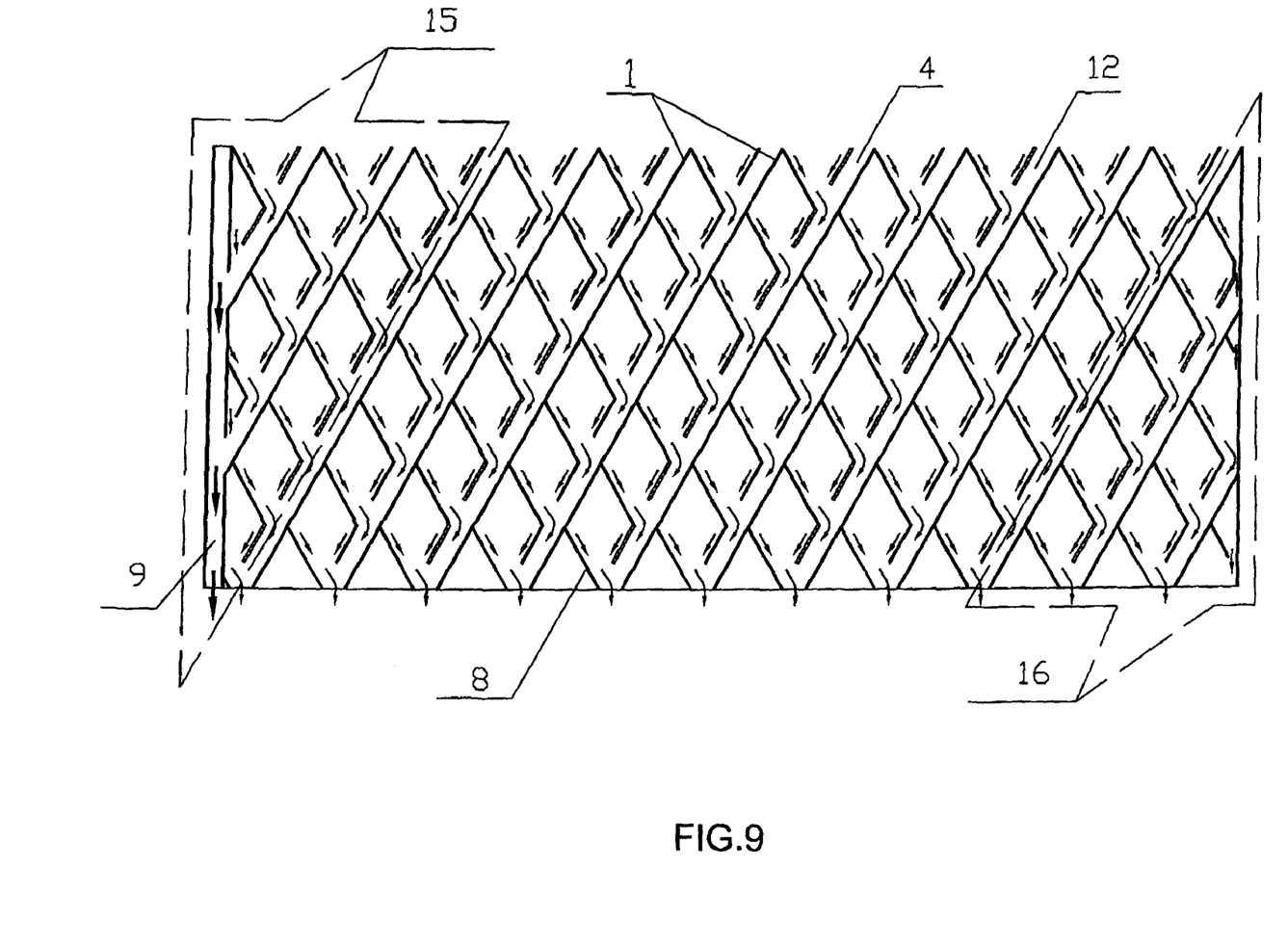
FIG. 9 describes the diagram of intermediate cross-section of the horizontal-tube sedimentation-separation apparatus of a seventh embodiment of the present invention.

As described in FIG. 9, down the inner side of main body is a lower compensating body 16 incorporates multiple groups of inclined plates with their width gradually decreased from top to bottom. The cross-sections of the lower compensating body, the upper compensating body 15 and the main body mix and form a rectangle. It works if the matched sedimentation tank is normal and have rectangular cross-section. Other components and structures are the same as described in the fifth embodiment.

Eighth Embodiment

Figure 10:
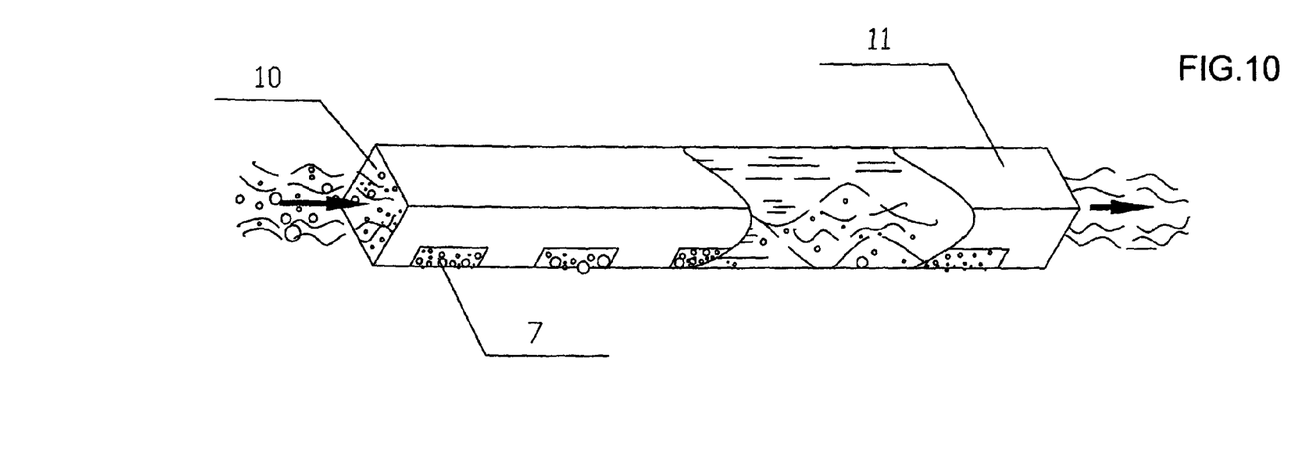
FIG. 10 describes the tube material structure diagram of the horizontal-tube sedimentation-separation apparatus of an eighth embodiment of the present invention.
Figure 11:
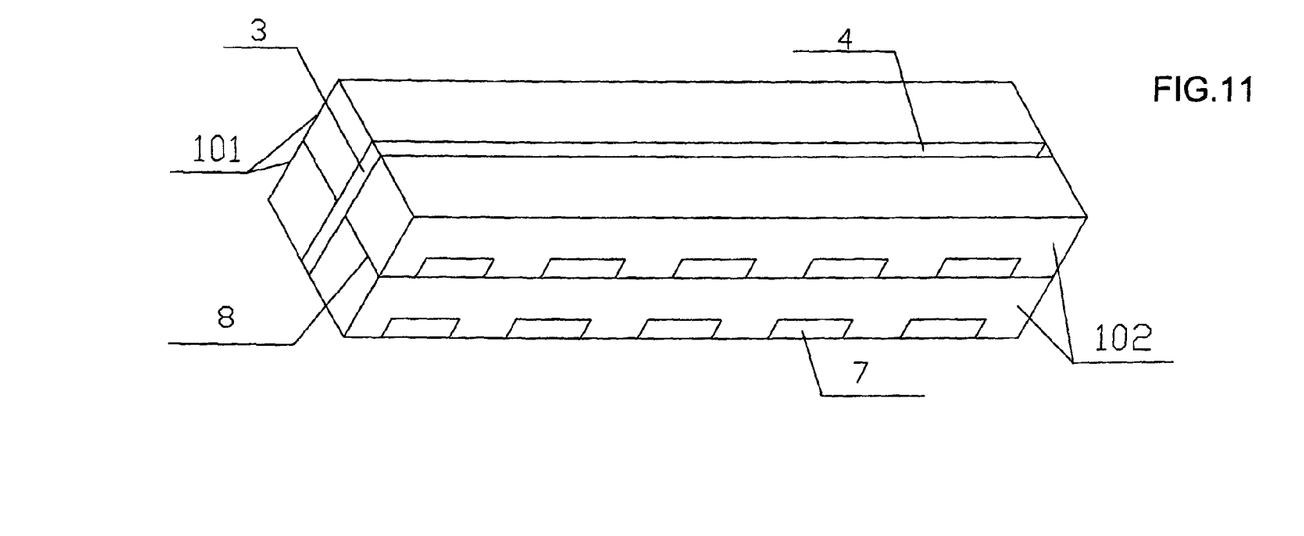
FIG. 11 describes the diagram of the horizontal-tube sedimentation-separation apparatus that consists of tube materials.

As described in FIG. 10, the flat supporting plate 7 separates the water flowing region into several raw water channels 10 that have parallelogram cross-section. The upper and lower inclined plates 101, isolated plates 2 and flat supporting plates 8 around each of the channel 10 form tube material 11 which have parallelogram cross-section. In other words, this horizontal-tube sedimentation-separation apparatus can be composed of multiple tube materials 11 with sludge-disposal ports 7 or long-tank 6 and has parallelogram cross-section combined with baffle 3, as described in FIG. 11.

Figure 12:
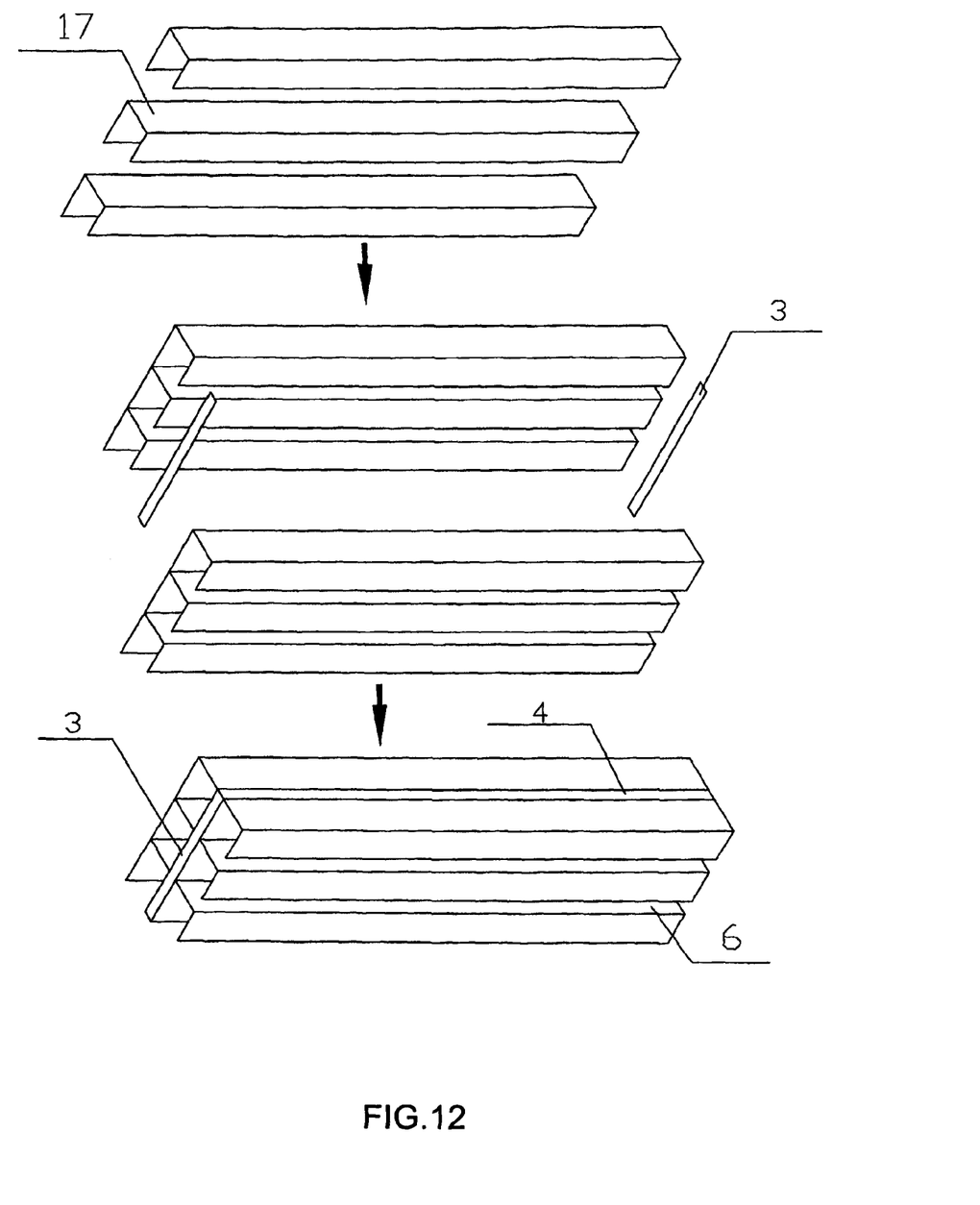
FIG. 12 describes the process diagram of the horizontal-tube sedimentation-separation apparatus that consists of section materials.

As described in FIG. 12, the apparatus is definitely can be composed of section materials with ⊓ type cross-section combined with baffle 3. It is practically a transformation of the eighth embodiment. Therefore, this variation along with any other variation that stems from the design thinking of this invention should be under protection.

The components disclosed in the various publications, disclosed or incorporated by reference herein, may possibly be used in possible embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following documents are hereby incorporated by reference as if set forth in their entirety: Bounds, T. R. 1994. *Septic tank sizes for large flows*. Proceedings of the Seventh International Symposium on Individual and Small Community Sewage Systems. Amer. Soc. Ag. Engineers, Atlanta, Ga., Dec. 11-13, 1994; Bounds, T. R. 1997(b). *Septic tank septage pumping intervals*. Texas Onsite Wastewater Treatment Research Council Conference, Plano, Tex., Apr. 13-15, 1997; Bounds, T. R., G. Denn, and N. T. Bounds. 2004. *Maintaining and troubleshooting advanced onsite systems: git 'er done*! Proceedings of the National Onsite Water Recycling Association's 13th Annual Conference, Albuquerque, N. Mex., Nov. 7-11, 2004; Brooks, B. 2006. Proceedings of the National Onsite Water Recycling Association, 15th Annual Conference, Denver, Colo., Aug. 28-30, 2006; Christopherson, S. H., D. G. Gustafson, and J. Anderson. 2006. *Preliminary Evaluation of Cluster System Septic Tank Performance*. Proceedings of the National Onsite Water Recycling Association, 15th Annual Conference, Denver, Colo., Aug. 28-30, 2006; Clark, G. H. 1998. *The Effect of Bacterial Additives on Septic Tank Performance*. Master's Thesis, North Carolina State University, Raleigh, N.C., 1998; Crites, R. and G. Tehobanoglms. 1998. *Small and decentralized wastewater management systems*. McGraw-Hill: New York, 1998; Etnier, C., D. Braun. A. Grenier, A. Macrellis, R. J. Miles, and T. C. White. 2005. *Micro-Scale Evaluation of Phosphorus Management: Alternative Wastewater Systems Evaluation*. Project No. WU-HT-03-22. Prepared for the National Decentralized Water Resources Capacity Development Project, Washington University, St. Louis, Mo. by Stone Environmental, Inc., Montpelier, Vt., 2005; Hinkle, S. R., R. J. Weick, J. M. Johnson, J. D. Cahill, S. G. Smith, and B. J. Rich. 2005. *Organic Wastewater Compounds, Pharmaceuticals, and Coliphage in Groundwater Receiving Discharge From Onsite Wastewater Treatment Systems Near La Pine, Oreg.: Occurrence and Implications for Transport*. Project No. WLTHT-03-05. Prepared for the National Decentralized Water Resources Capacity Development Project, Washington University, St. Louis, Mo., by Oregon Department of Environmental Quality, Portland, Oreg., 2005; Hoover, M. T., D. M. Sievers, and D. M. Gustafson. 1998. *Performance Standards for On-site Wastewater Treatment Systems*. Proceedings of Eighth National Symposium on Individual and Small Community Sewage Systems, ASAE, American Society of Agricultural and Biological Engineers, March 8-10, Orlando, Fla., 1998; LaKind and Bouwer. 2003. *Investigation of the Removal of Formaldehyde and Phenol by Funeral Home Septic Systems*. Report. National Funeral Directors Association, Brookfield, Wis., 2003; Lens, P., G. Zeeman, and G. Letting a. 2001. *Decentralized Sanitation and Reuse*. IWA Publishing: London, March 2001, ISBN 1900222477; Lesikar, B. J., O. A. Garza, R. A. Persyn, M. T. Anderson, and A. L. Kenimer. 2004. *Food-service Establishments Wastewater Characterization*. Proceedings of the Tenth National Symposium on Individual and Small Community Sewage Systems, Amer. Soc. Ag. Engineers, Sacramento, Calif., Mar. 21-24, 2004; Lesikar, D. J., O. A. Garza, R. A. Persyn, A. L. Kenimer, and M. T. Anderson. 2005. *The Strength of Wastewater as Impacted by Restaurant Management Practices*. Proceedings of the National Onsite Water Recycling Association, 14th Annual Conference, Cleveland, Ohio, Oct. 10-13, 2005; Matassa, M., C. L. McEntyre, and J. T. Watson. 2005. *Tennessee Valley Marina and Campground Wastewater characterization Screening Study*. Water Environment Federation Annual Technical Exhibition and Conference (WEFTEC 05), 2005; Pearson, F., D. Jenkins, H. McLean, and S. A. Klein. 1980. *Recreation Vehicle Waste Disposal in Roadside Rest Septic Tank Systems*. Report. Sanitary Engineering Research Laboratory, University of California, Berkeley, Calif.; Philip, H., S. Maunoir, A. Rambaud, and S. Philippi. 1993. *Septic Tank Sludges: Accumulation Rate Biochemical Characteristics*. Proceedings of the Second International Specialized Conference on Design and Operation of Small Wastewater Treatment Plants, Norway; Sauer, P. A. and E. J. Tyler. 1992. *Motor Vehicle Waste Fluid Impacts on Septic Tank/Wastewater Infiltration Systems*. Report. Small Scale Waste Management Project, University of Wisconsin, Prepared for the 7th Northwest On-Site Wastewater Treatment Short Course and Equipment Exhibition, Sep. 14-15, 1992; Sauer, P. A. and E. J. Tyler. 1996. Heavy Metal and Volatile Organic Chemical Removal and Treatment in On-site Wastewater Systems. *Water, Air, and Soil Pollution*, v. 89, pp. 221-232; Siegriest, R. L. 1977(a). *Segregation and Separate Treatment of Black and Grey Household Wastewaters to Facilitate Onsite Surface Disposal*. Report. University of Wisconsin Press: Madison, Wis., 1977; Siegrist, R. L. and W. C. Boyle. 1981. *Onsite Reclamation of Residential Greywater*. Proceedings of the Third National Symposium on Individual and Small Community Sewage Systems, Amer. Soc. Ag. Engineers, 1981; Troyan, J. J., G. J. Sewards, and R. J. Fimmel. 1994 *Comprehensive Research on Septic Tank-Soil Absorption Systems in Perth, Australia*. Proceedings of the Fourth National Symposium on Individual and Small Community Sewage Systems, Amer. Soc. Ag. Engineers, Dec. 10-11, 1984; Tyler, E. J., R. B. Corey, and M. U. Olotu. 1978. *Potential Effects of Water Softener Use on Septic Tank—Soil Absorption On-site Waste Water Systems*. University of Wisconsin Press: Madison, Wis., 1978; Hazen, A. 1904. *On Sedimentation*. Trans. ASCE. Paper No. 980, Proceedings of Annual Meeting of Jun. 1, 1904; and D'Amato, Victor A., Anita Bahe, Terry Bounds, Billie Comstock, Thomas Konsler, Sarah K. Liehr, Sharon C. Long, Kris Ratanaphruks, Chet A. Rock, and Kevin Sherman. *Factors Affecting the Performance of Primary Treatment in Decentralized Wastewater Systems*. Report. London: IWA Publishing, 2008.

All of the patents, patent applications or patent publications, which were cited in the International Search Report dated Mar. 20, 2008, and/or cited elsewhere are hereby incorporated by reference as if set forth in their entirety herein as follows: CN 2853104, having the following English translation of the Chinese title "WIND FIRE EXTINGUISHER," published on Jan. 3, 2007; U.S. Pat. No. 4,328,101, having the title "DEVICE FOR SEPARATING PARTICULATE MATTER FROM A FLUID," published on May 4, 1982; and JP 56045712, having the following English translation of the Japanese title "PRECISE DUST REMOVER," published Apr. 25, 1981.

The patents, patent applications, and patent publications, and other documents listed above in the preceding two paragraphs are herein incorporated by reference as if set forth in their entirety. The purpose of incorporating U.S. patents, non-U.S. patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, People's Republic of China Patent Application No. 200610123752.2, filed on Nov. 24, 2006, having inventors Liangchun ZHANG and Jianguo ZHANG, and International Application No. PCT/CN2007/003313, filed on Nov. 23, 2007, having WIPO Publication No. WO 2008/061455 and inventors Liangchun ZHANG and Jianguo ZHANG, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the People's Republic of China and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/CN2007/003313 and People's Republic of China Patent Application 200610123752.2, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/CN2007/003313 and CN 200610123752.2 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A horizontal-tube sedimentation-separation apparatus comprising:
    a first side wall and a second side wall;
    a plurality of parallel inclined plate arrangements being disposed between said first and second side walls;
    each of said plate arrangements comprising:
        a first inclined plate;
        a second inclined plate being disposed parallel to said first inclined plate;
        said second inclined plate comprising a plurality of sludge-disposal openings, each being in the form of a single elongated opening or a plurality of separate openings disposed to run in the direction of a horizontal flow of water through said horizontal-tube sedimentation-separation apparatus;
        a side baffle plate being disposed between and transverse to said first and second inclined plates; and
        a plurality of parallel support plates being disposed to extend from and transverse to said second inclined plate;
    said side baffle plate being disposed on one side of said first and second inclined plates and to connect said first and second inclined plates;
    said side baffle plate being disposed transverse to the horizontal flow of water and upstream of said first and second inclined plates to block the horizontal flow of water into a static fluid region between said first and second inclined plates to minimize disturbance of sludge in said static fluid region;
    said plurality of plate arrangements comprising at least a first plate arrangement and a second plate arrangement;
    said plurality of support plates of said first plate arrangement being connected to said first inclined plate of said second plate arrangement;
    said second inclined plate of said first plate arrangement, said plurality of support plates of said first plate arrangement, and said first inclined plate of said second plate arrangement, being configured and disposed to together define a plurality of horizontal water channels, each having a parallelogram-shaped cross-section; and
    said sludge-disposal openings being disposed to permit sludge to exit said horizontal, parallelogram-shaped water channels and enter said static fluid region between said first inclined plate and said second inclined plate of each of said plate arrangements.

2. The horizontal-tube sedimentation-separation apparatus according to claim 1, wherein each of said supporting plates has an upper end connected to a corresponding first inclined plate and a lower end connected to a corresponding second inclined plate, and wherein each lower end is disposed adjacent a corresponding sludge-disposal opening and configured to guide sludge into said sludge-disposal openings.

3. The horizontal-tube sedimentation-separation apparatus according to claim 2, wherein said first side wall and said second side wall are parallel and inclined such that said horizontal-tube sedimentation-separation apparatus has a parallelogram-shaped cross-section.

4. The horizontal-tube sedimentation-separation apparatus according to claim 2, wherein:
    said first side wall is perpendicular to a top of said horizontal-tube sedimentation-separation apparatus such that said horizontal-tube sedimentation-separation apparatus has inverted right-angled trapezoid-shaped cross-section;
    said second side wall is inclined parallel to said inclined plates;
    a first plurality of said plate arrangements are disposed to terminate at said first side wall;
    each of said first plurality of plate arrangements increases in overall length starting with the plate arrangement disposed closest to an upper portion of said first side wall and ending with the plate arrangement disposed furthest from said upper portion of said first side wall, which first plurality of plate arrangements define an area having a right triangular cross-section; and
    each of said static fluid regions in said first plurality of plate arrangements is connected to a vertical sedimentary slide path disposed to run parallel to said first side wall.

5. The horizontal-tube sedimentation-separation apparatus according to claim 2, wherein:
    each of said first side wall and said second side wall is perpendicular to a top of said horizontal-tube sedimentation-separation apparatus such that said horizontal-tube sedimentation-separation apparatus has a rectangular cross-section;
    a first plurality of said plate arrangements are disposed to terminate at said first side wall;
    a second plurality of said plate arrangements are disposed to extend from said second side wall;
    each of said first plurality of plate arrangements increases in overall length starting with the plate arrangement disposed closest to an upper portion of said first side wall and ending with the plate arrangement disposed furthest from said upper portion of said first side wall, which first plurality of plate arrangements define an area having a right triangular cross-section;
    each of said second plurality of plate arrangements increases in overall length starting with the plate arrangement disposed closest to a lower portion of said second side wall and ending with the plate arrangement disposed furthest from said lower portion of said second side wall, which second plurality of plate arrangements define an area having a right triangular cross-section; and each of said static fluid regions in said first plurality of plate arrangements is connected to a vertical sedimentary slide path disposed to run parallel to said first side wall.

6. The horizontal-tube sedimentation-separation apparatus according to claim 2, wherein all the angles formed between inclined plates and supporting plates and the horizontal surface are 60°.

7. The horizontal-tube sedimentation-separation apparatus according to claim 2 in combination with a sedimentation tank.

8. A horizontal-tube sedimentation-separation apparatus comprising:

multiple parallel inclined plates being disposed in pairs comprising an upper inclined plate and a lower inclined plate;

isolated plates between each pair of inclined plates which are parallel to said inclined plates;

at least one baffle disposed under each of said isolated plates;

each baffle is transverse to the water flowing direction and blocks water flowing under the isolated plates;

a flat supporting plate between said isolated plate and said upper inclined plate, which flat supporting plate separates the water flowing region into several water channels that have a parallelogram-shaped cross-section;

said upper and lower inclined plates, said isolated plates, and said flat supporting plates form said parallelogram-shaped water channels;

a plurality of sludge-disposal paths on said isolated plates; and each sludge-disposal path comprises a long-tank extended in the water flowing direction or multiple sludge-disposal ports distributed along the water flowing direction.

9. The horizontal-tube sedimentation-separation apparatus according to claim 8, wherein said flat supporting plates each have an upper end which connects with an inclined plate and a lower end which connects flush with the bottom margin of a sludge-disposal path.

10. The horizontal-tube sedimentation-separation apparatus according to claim 9, wherein the main body of the horizontal-tube sedimentation-separation apparatus has a parallelogram cross-section inclined toward one side.

11. The horizontal-tube sedimentation-separation apparatus according to claim 10, wherein all the angles formed between inclined plates, isolated plates, flat supporting plates and the horizontal surface are 60°.

12. The horizontal-tube sedimentation-separation apparatus according to claim 10 in combination with a sedimentation tank.

13. The horizontal-tube sedimentation-separation apparatus according to claim 9, wherein:

the main body of the horizontal-tube sedimentation-separation apparatus has an inverted right-angled trapezoid cross-section which has an inclined side and a right-angle side;

adjacent said right-angle side are multiple groups of inclined plates, the width of which gradually increases from top to bottom in a direction moving away from said right-angle side; and the static fluid regions between said multiple groups of inclined plates connect with a vertical sedimentary slide path disposed adjacent said right-angle side.

14. The horizontal-tube sedimentation-separation apparatus according to claim 13, wherein all the angles formed between inclined plates, isolated plates, flat supporting plates and the horizontal surface are 60°.

15. The horizontal-tube sedimentation-separation apparatus according to claim 13 in combination with a sedimentation tank.

16. The horizontal-tube sedimentation-separation apparatus according to claim 9, wherein:

the main body of the horizontal-tube sedimentation-separation apparatus has a rectangular cross-section which has a first right-angle side and a second right-angle side;

adjacent each of said right-angle sides are multiple groups of inclined plates, the width of which gradually increases from top to bottom in a direction moving away from each of said right-angle sides; and the static fluid regions between said multiple groups of inclined plates adjacent said first right-angle side connect with a vertical sedimentary slide path disposed adjacent said first right-angle side.

17. The horizontal-tube sedimentation-separation apparatus according to claim 16, wherein all the angles formed between inclined plates, isolated plates, flat supporting plates and the horizontal surface are 60°.

18. The horizontal-tube sedimentation-separation apparatus according to claim 16 in combination with a sedimentation tank.

19. The horizontal-tube sedimentation-separation apparatus according to claim 9, wherein all the angles formed between inclined plates, isolated plates, flat supporting plates and the horizontal surface are 60°.

20. The horizontal-tube sedimentation-separation apparatus according to claim 9 in combination with a sedimentation tank.

* * * * *